United States Patent
Singh et al.

(10) Patent No.: US 10,757,049 B2
(45) Date of Patent: Aug. 25, 2020

(54) ACTIONS IN A MESSAGING SYSTEM

(71) Applicant: Microsoft Technology Licensing, LLC, Redmond, WA (US)

(72) Inventors: Harshvardhan Singh, Hyderabad (IN); Arun Rajappa, Hyderabad (IN); Jayawant Tewari, Bangalore (IN); Abhisek Kumar Behera, Hyderabad (IN); Prashant Gupta, Hyderabad (IN); Apoorv Seth, Hyderabad (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 15 days.

(21) Appl. No.: 15/695,748

(22) Filed: Sep. 5, 2017

(65) Prior Publication Data
US 2019/0028411 A1    Jan. 24, 2019

(30) Foreign Application Priority Data

Jul. 24, 2017   (IN) .............................. 201741026149

(51) Int. Cl.
*G06F 3/00* (2006.01)
*H04L 12/58* (2006.01)

(52) U.S. Cl.
CPC ............ *H04L 51/046* (2013.01); *H04L 51/18* (2013.01); *H04L 51/32* (2013.01); *H04L 51/10* (2013.01)

(58) Field of Classification Search
CPC ........ H04L 51/046; H04L 51/32; H04L 51/10
See application file for complete search history.

(56) References Cited

U.S. PATENT DOCUMENTS

| | | | |
|---|---|---|---|
| 9,076,129 B2 | 7/2015 | Grewal et al. | |
| 2002/0138582 A1 | 9/2002 | Chandra et al. | |
| 2008/0046510 A1* | 2/2008 | Beauchamp | G06Q 10/107 709/204 |
| 2008/0189620 A1 | 8/2008 | Bonforte et al. | |
| 2008/0288301 A1 | 11/2008 | Emling et al. | |
| 2011/0015961 A1 | 1/2011 | Chan | |
| 2015/0113447 A1* | 4/2015 | Lineberger | H04W 4/21 715/758 |
| 2016/0105383 A1* | 4/2016 | Seymour | H04L 51/18 709/205 |
| 2017/0237692 A1* | 8/2017 | Sheth | H04L 51/02 715/758 |

FOREIGN PATENT DOCUMENTS

CA            255965 A1    2/2003

OTHER PUBLICATIONS

"Board Basics", https://trello.com/guide/board-basics.html, Retrieved on: Jun. 15, 2017, 13 pages.

(Continued)

*Primary Examiner* — Anil N Kumar
(74) *Attorney, Agent, or Firm* — Michael Best & Friedrich LLP

(57) ABSTRACT

A messaging system for effecting effect instant messaging communication sessions (chats) between users of the messaging system allows "actions" to be exchanged in chats. The actions are generated in an action database. A template-creating user can create a custom action template for generating actions, which is only available to certain users.

20 Claims, 11 Drawing Sheets

(56) References Cited

OTHER PUBLICATIONS

Koenigsbauer, Kirk, "Introducing Microsoft Teams—the chat-based workspace in Office 365", https://blogs.office.com/2016/11/02/introducing-microsoft-teams-the-chat-based-workspace-in-office-365/, Published on: Nov. 2, 2016, 8 pages.

"Kaizala an app for Android and iOS", https://web.archive.org/web/20161007075236/https:/www.microsoft.com/en-us/garage/project-details.aspx?project=kaizala, Published on: Oct. 7, 2016, 1 page.

"A faster way for your team to communicate", https://flock.com/in/business-sme/?sub3=campaign_id%3Aacq-teams~source%3Agoog-sem-cpc~sub_campaign%3Achat&ref_id?jjyoNWiOXbj3IMsj, Retrieved on: Jun. 15, 2017, 11 pages.

"Trello lets you work more collaboratively and get more done.", https://trello.com/wahidsabari/recommend, Retrieved on: Jun. 15, 2017, 7 pages.

"Slack for project management", https://get.slack.help/hc/en-us/articles/218130338-Slack-for-project-management, Retrieved on: Jun. 15, 2017, 6 pages.

Sherman, Gary, "Dovetail Task Manager Introduction", http://clarify.dovetailsoftware.com/gsherman/2016/06/06/dovetail-task-manager-introduction/, Published on: Jun. 6, 2016, 8 pages.

"Kanban Guide & Learning Center", https://www.digite.com/kanban-guide/what-is-a-kanban-board/, Retrieved on: Jun. 15, 2017, 6 pages.

"Cola", http://www.cola.io/, Retrieved on: Jun. 15, 2017, 2 pages.

"International Search Report and Written Opinion Issued in PCT Application No. PCT/US2018/034817", dated Sep. 3, 2018, 14 Pages.

\* cited by examiner

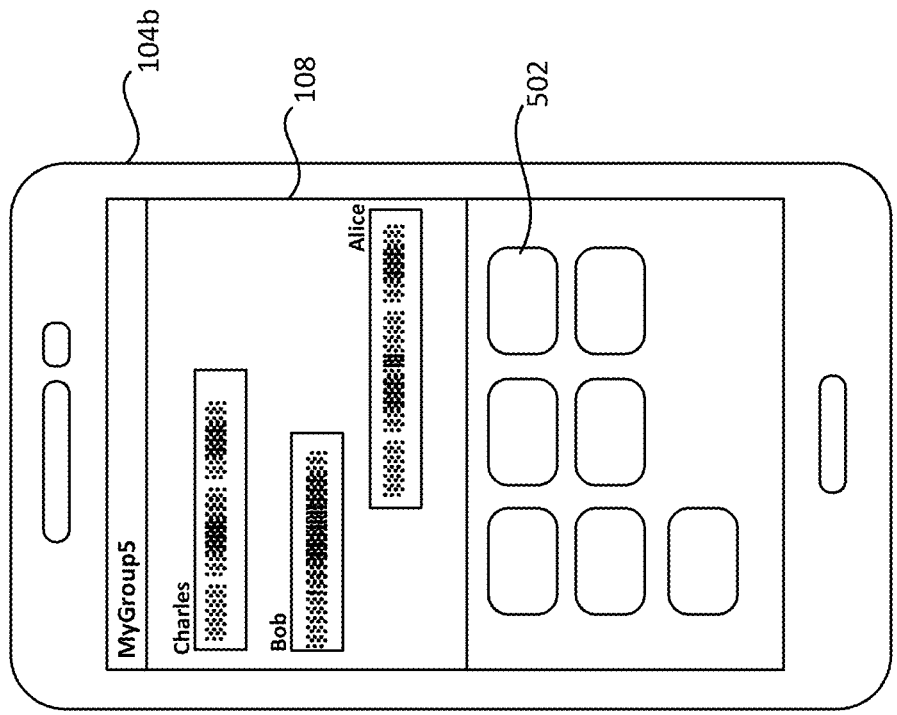
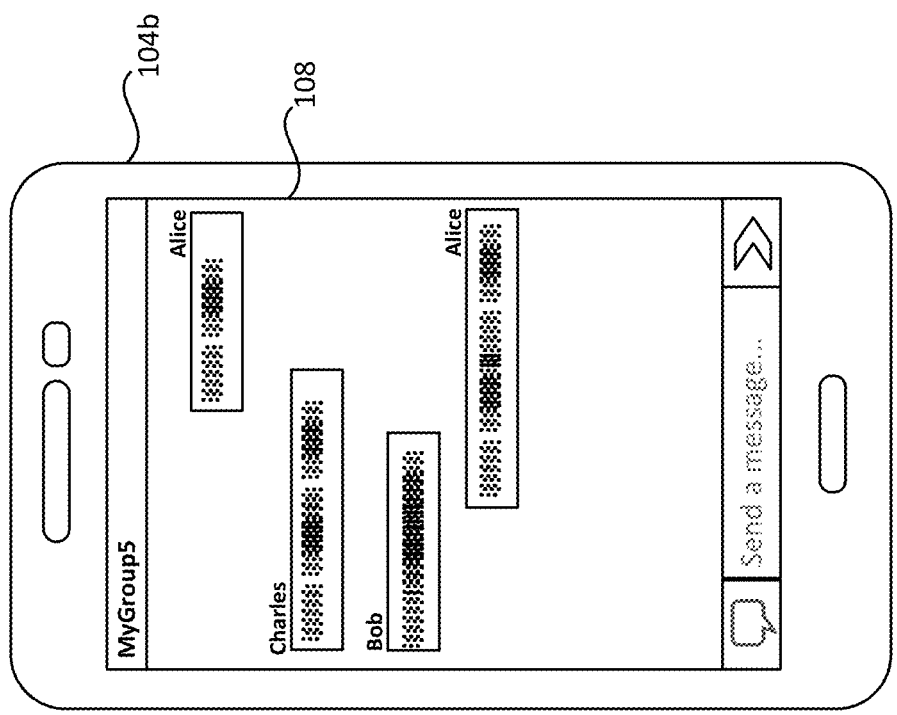
Fig. 5B
Fig. 5A

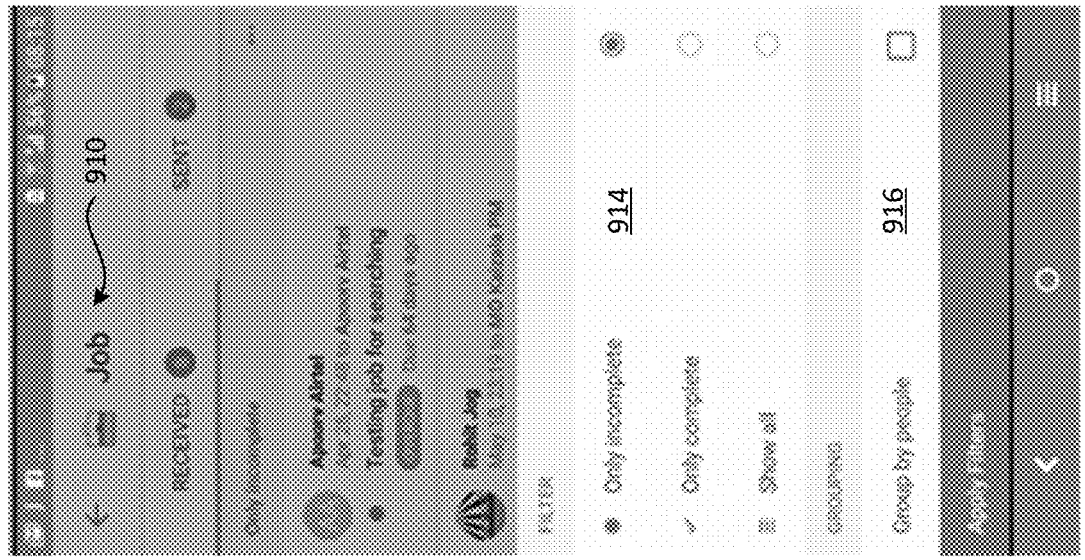
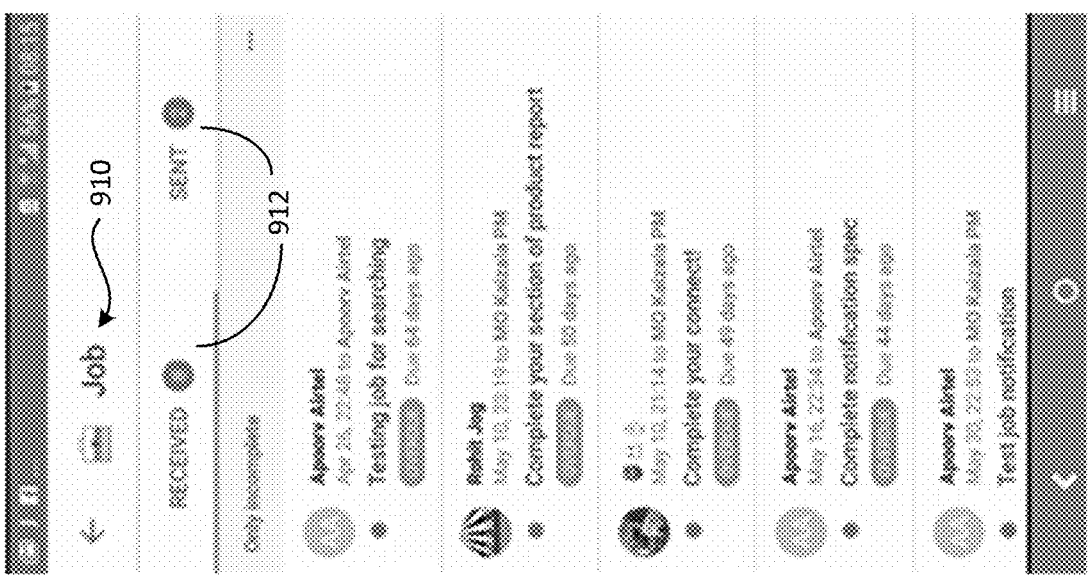
Fig. 7A
Fig. 7B

Fig. 8C

ACTIONS IN A MESSAGING SYSTEM

RELATED APPLICATIONS

This application claims priority under 35 USC 119 or 365 to India Application No. 201741026149 filed Jul. 24, 2017, the disclosure of which is hereby incorporated by reference in its entirety.

TECHNICAL FIELD

The present disclosure pertains to the generation of actions in a messaging system.

BACKGROUND

A messaging system allows users of the messaging system to exchange (instant) messages with other users of the messaging system in an instant messaging communication session. In order to use the messaging system, each user operates a user device with an instance of a messaging application (app) executed on that device. The messages are primarily text-based, but can also comprise rich content such as images, videos, documents, audio etc. In an example, this is referred to as instant messaging. The messaging takes place in real time, in that there is typically only a short delay (e.g. about two seconds or less) between a user sending a message and it being received by its intended recipient(s). The messages are transmitted and received between users via a network, for example a packet-based network such as the Internet, in the instant messaging communication session.

To provide a richer communication experience, the users may also be able to exchange "actions" within an instant messaging communication session, such as jobs, polls and surveys. One user generates an action, which the other users respond to, for example by providing information about a job (task), answering survey questions, or voting in a poll.

SUMMARY

A first aspect of the present invention is directed to a messaging system comprising: a messaging component configured to effect instant messaging communication sessions between users of the messaging system; a user database configured to hold user identifiers of the users; template storage configured to store action templates; a template creation interface configured to receive, from a template-creating user, template creation data for creating a custom action template and associated data identifying a subset of the user identifiers; a template manager configured to create in the template storage a custom action template according to the template creation data, and associate the custom action template with the subset of user identifiers so as to render the custom action template available to only the users having the subset of associated user identifiers; an action database configured to hold actions; and an action manager configured to generate each of the actions in the action database, in response to an instruction from an action-generating user, according to one of the action templates available to the action-generating user, wherein the messaging component is configured to transmit a message to a user device of at least one action-receiving user to render data of the generated action accessible to the action-receiving user in an instant messaging communication session.

In embodiments, the template storage may be configured to store generic action templates available to all of the users of the messaging system.

Instant messages transmitted and received between the action-generating user and the action-receiving user may be displayed as a sequence of messages at the user device of the action-receiving user, and the messaging component is configured to transmit the message to cause a notification of the action to be displayed at the user device in the displayed sequence of messages.

The action manager may be configured to modify the action in the action database in response to an instruction from the action-receiving user, and to transmit a message to a user device of the action-generating user to render data of the modified action accessible to the action-generating user in the instant messaging communication session.

The messaging system may be configured to cause a user device of the action-generating user to display a set of user interface elements, each representing one of the action templates available to the action-generating user, and the action manager may be configured to generate, in response to the action-generating user selecting one of the user interface elements, the action according to the action template represented by the selected user interface element.

At least one of the user interface elements may represent a generic action template and at least another of the user interface elements represents a custom action template available to the action-generating user.

The action may be associated in the action database with the user identifier of the action-generating user and/or the user identifier of the action-receiving user.

The messaging system may comprise a search component configured to receive a search input, and generate search results by searching the action database according to the search input for actions generated and/or received by that user.

The search input may be received from the action-generating or the action-receiving user and the search component may be configured to generate the search results by searching for actions generated by that user and/or actions received by that user.

The custom action template may have at least one custom attribute derived from the template creation data, wherein any action generated according to the custom action template comprises a value of the custom attribute.

The search component may be configured to search the action database based on the custom attribute.

The custom action template may be associated in the template storage with at least one custom filter derived from the template creation data for the at least one custom attribute, wherein the search component may be configured to filter the search results according to the custom filter.

The custom action template may be associated in the template storage with at least one custom grouping rule derived from the template creation data for the at least one custom attribute, wherein the search component may be configured to group the search results according to the custom grouping rule.

The custom attribute may be marked as indexable in the template creation data and the template manager may be configured to index the custom attribute in response to determining that the custom attribute is marked as indexable in the template creation data.

The subset of user identifiers may be bound to a common identifier in the user database, wherein the data identifying the subset of users may comprise or indicate the common identifier and thereby identify the subset of the user identifiers.

The data identifying the subset of users may comprise or indicate an identifier of the template-creating user, which is associated with the common identifier in the user database.

A second aspect of the invention is directed to a method of creating action templates in a messaging system, the messaging system for effecting instant messaging communication sessions between users of the messaging system and having a user database holding user identifiers of the users, the method comprising, at the messaging system: receiving, from a template-creating user, template creation data for creating a custom action template and associated data identifying a subset of the user identifiers held in the user database of the messaging system; creating in template storage a custom action template according to the template creation data, the custom action template for generating an action in an action database of the messaging system; and associating the custom action template with the subset of user identifiers so as to render the custom action template available to only the users having the subset of associated user identifiers.

A corresponding method and computer program product are disclosed.

In embodiments, the method may comprise: in response to an instruction from one of the subset of users, generating an action in the action database according to the custom action template; and transmitting a message to a user device of at least one action-receiving user to render data of the generated action accessible to the action-receiving user in an instant messaging communication session effected by the messaging system.

The action-receiving user may be one of the subset of users.

A third aspect of the invention is directed to a computer program product for use in a messaging system, the messaging system having a user database configured to hold user identifiers of the users, the computer program product comprising code stored on a computer-readable storage medium and configured, when executed in the messaging system, to implement operations of: receiving a user identifier of an action-generating user; accessing template storage holding a custom action template, wherein the custom action template is associated with a subset of the user identifiers such that the custom action template is available to only the users having the subset of associated user identifiers; determining that the received user identifier matches one of the subset of user identifiers associated with the custom action template and, in response, causing a user interface element representing the custom action template to be displayed at a user device of the action-generating user; in response to an instruction from the action-generating user, generating an action in an action database according to the custom action template; and transmitting a message to a user device of at least one action-receiving user to render data of the generated action accessible to the action-receiving user in an instant messaging communication session effected by the messaging system.

A corresponding method and messaging system are disclosed.

A fourth aspect of the invention is directed to a computer program product comprising computer-readable instruction stored on a computer-readable storage medium and configured, when executed, to implement any of the method steps or system functionality disclosed herein.

BRIEF DESCRIPTION OF FIGURES

For a better understanding of the present invention, and to show how embodiments of the same may be carried into effect, reference is made to the following figures in which:

FIG. 5A shows a schematic illustration of a messaging interface displayed on a mobile device of an action-generating user;

FIG. 5B shows a schematic illustration of a messaging interface on which action generation elements are displayed;

FIG. 7A shows an example of a search interface for searching actions;

FIG. 7B shows a set of filtering and grouping options displayed on a search interface; and FIGS. 8A, 8B, and 8C show an example structure for a JSON action template.

DETAILED DESCRIPTION OF EXAMPLE EMBODIMENTS

Figure 1:
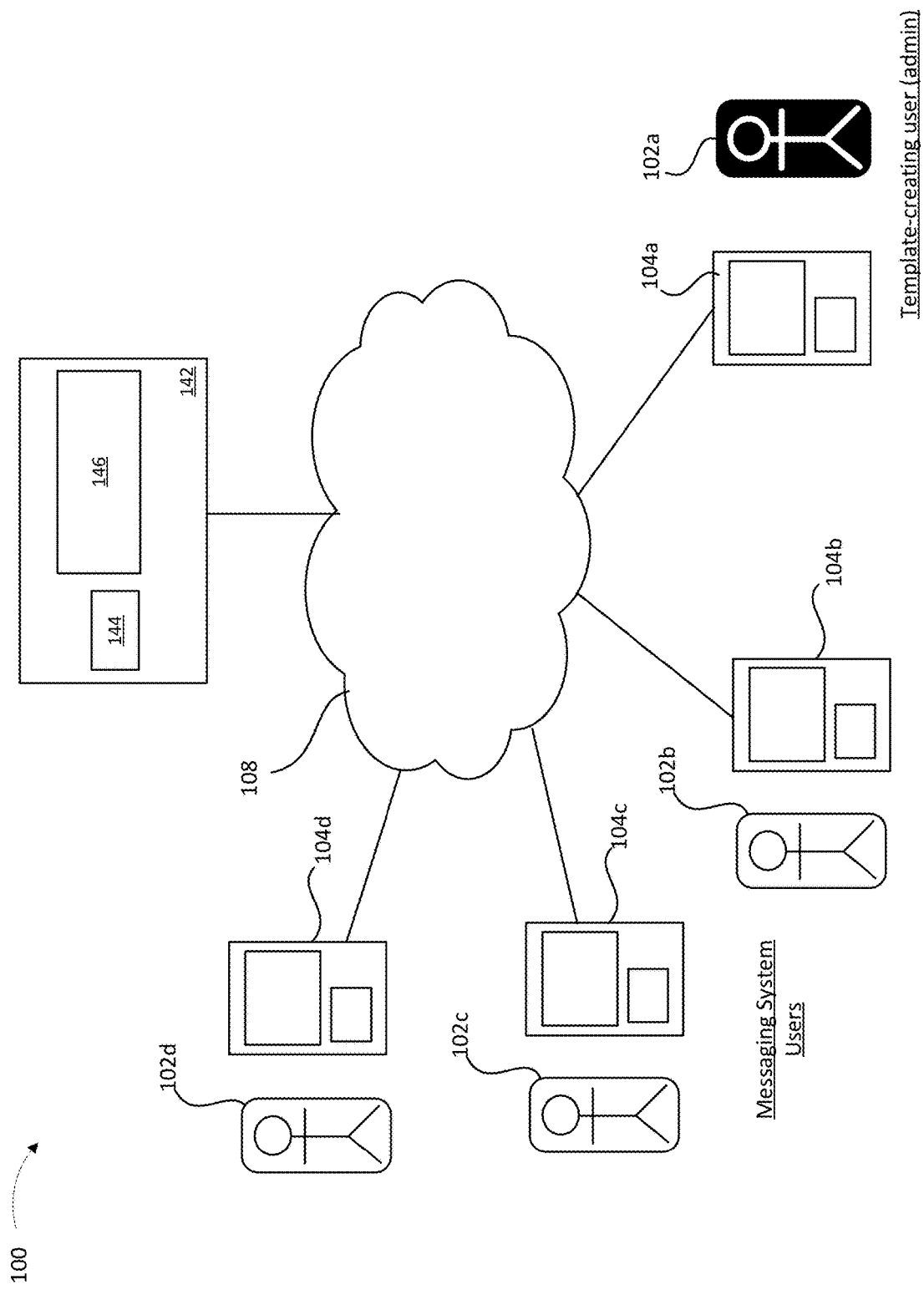
FIG. 1 shows a schematic block diagram of a messaging system.

An example messaging (chat) system will now be described. An organisation (tenant) can use the chat subsystem for connecting its people in multiple groups. The system is geared towards allowing users to get work done over chat, and work is more than just messages. Work involves tasks, meetings, bills and much more. The system provides different actions—also referred to as "cards" herein—which, along with other constructs (like locations, photos etc.), help people get work done. For example: the "Job" action is a mini app that is sent over a chat stream to different people in the organization to get specific tasks done. Polls and surveys are actions can be sent in a group to capture everyone's responses and even obtain aggregated reports across multiple groups. Similarly an action may request a user to "Respond with a Photo" or location to validate if the work assigned to them is completed. With multiple groups involving multiple people, there will be many such actions that are assigned.

Existing chat services allow users to send and receive cards containing information between users on a tenant. The cards are a conduit for requesting, sending and/or monitoring the flow of information and tasks within the users.

A novel aspect of the described system is its extensibility, in that it allows users to create custom action types, by defining custom action templates that are only available to certain users. Different organizations (orgs) can deploy custom action templates suiting their needs. The system only shows those items that are specific to this org when a user within that org wants to find out the work assigned to them. Moreover, users can only use custom action templates created for their own organization.

A custom action has custom attribute(s), and the values of those attributes can be changed as users respond to the action within a chat. For example a "job" action may have one or more task attributes for specifying details of a task that needs to be completed, and one or more status attributes that can be updated to indicate the status of the task (e.g. pending, in-progress, complete, incomplete) as well as other attributes such as due date etc.—the material point being that the user creating a custom job action time is free to define these attributes as he sees fit. Similarly, a "vacation" action may have one or more timing attributes specifying a desired vacation time (e.g. date or date range), and one or more status attributes that can be updated to reflect the status of the request (e.g. pending, accepted, rejected). Custom actions provide a structured and highly customizable way for users to exchange and record information within a chat in in a productive workflow. The action is stored in an action database and messages are pushed to user devices (clients) within a chat as the action is generated and updates to notify the users participating in the chat. The structure of the action within the action database is set by the action template used to create it.

A tenant admin can access a portal specific to their tenant (which can be a web-portal or contained within a messaging application itself) to enable the tenant admin to create one or more tenant-specific cards for use within the tenant. The tenant specific cards can be presented to a user alongside generic cards. The presentation of cards can be an illustration of tasks that the user has to perform.

FIG. 1 shows a highly schematic block diagram of a messaging system 100 comprising a backend system 142 and a plurality of user devices 10a-d operated by users 102a-d respectively. The backend system 142 and user devices 10a-d are shown connected to a network 108, which is a packet-based computer network such as the Internet.

Figure 1A:
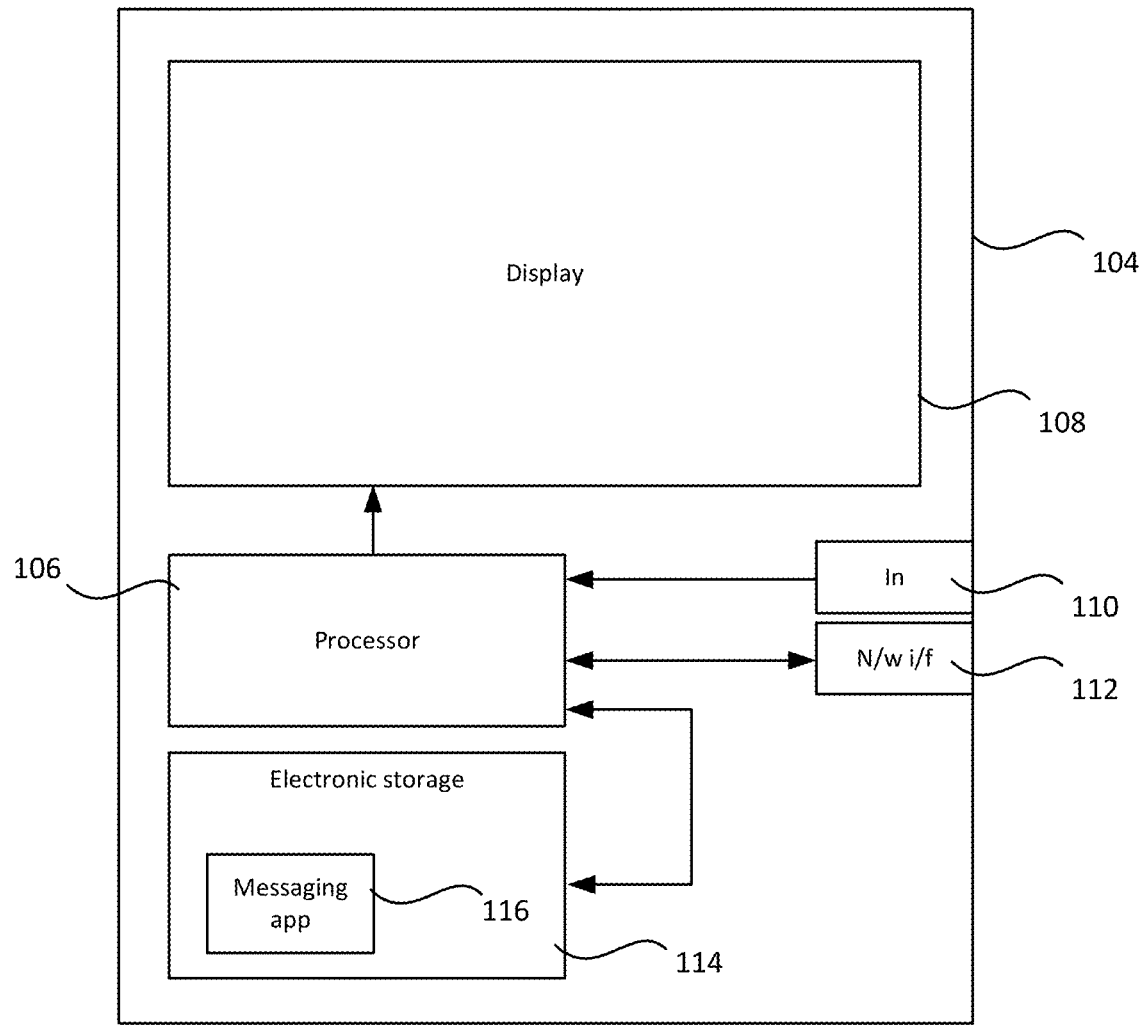
FIG. 1A shows a schematic block diagram of a user device.

FIG. 1A shows a schematic block diagram of an example user device 104, which is shown to comprise a processor 106 (such as a Central Processing Unit (CPU) or set of CPUs/CPU cores) and, connected to the processor 106, a display 108, which can be controlled to display visual information to a user of the device 104; an input device 110 for receiving user input from the user, such as touchscreen, mouse, trackpad, gesture or voice recognition device, etc.; a network interface 112 via which the user device 104 can connect to the network 108, and electronic storage 114. The electronic storage 114 is shown holding a messaging application 116 for execution on the processor 106, via which the user of the user device 104 can access services provided by the messaging system 100. To execute the messaging application 116, the processor 106 fetches instructions of the messaging application 116 and carries out functions according to those instructions in order to implement the functionality of the messaging application 116. In particular, the messaging application 116 has instructions that when executed on the processor 106 cause the user device 104 to connect via the network 108 to the backend system 142, thereby allowing the user 102 to access services provided by that system from his user device 104. The user device 104 can take a number of forms, such as a smartphone, tablet, personal computer etc.

As will be appreciated, FIG. 1A is highly schematic, and all description pertaining to the user device 104 applies equally to the user devices 10a-d in FIG. 1 even though they may differ in their specifics.

Returning to FIG. 1, the backend system 142 is shown to comprise at least one processor 144, such as a CPU or CPUs/CPU cores, and backend computer storage 146 accessible to the at least one processor 144. The at least one processor 144 is configured to execute message system code (not shown) stored in the backend computer storage 146 in order to implement the functionality of the backend system 142 that is described below. In particular, the messaging code has a messaging component, which implements, when executed, a messaging service (204, FIG. 2). The messaging code also implements an authentication function (205, FIG. 2). The backend system 142 can for example be implemented on a cloud platform. Cloud computing is well known per se so further details are not discussed herein. Alternatively, at least part of the functionality of the backend system 142 described herein could instead be implemented in a peer-to-peer fashion, wherein the user devices themselves cooperate to provide this functionality.

Figure 2:
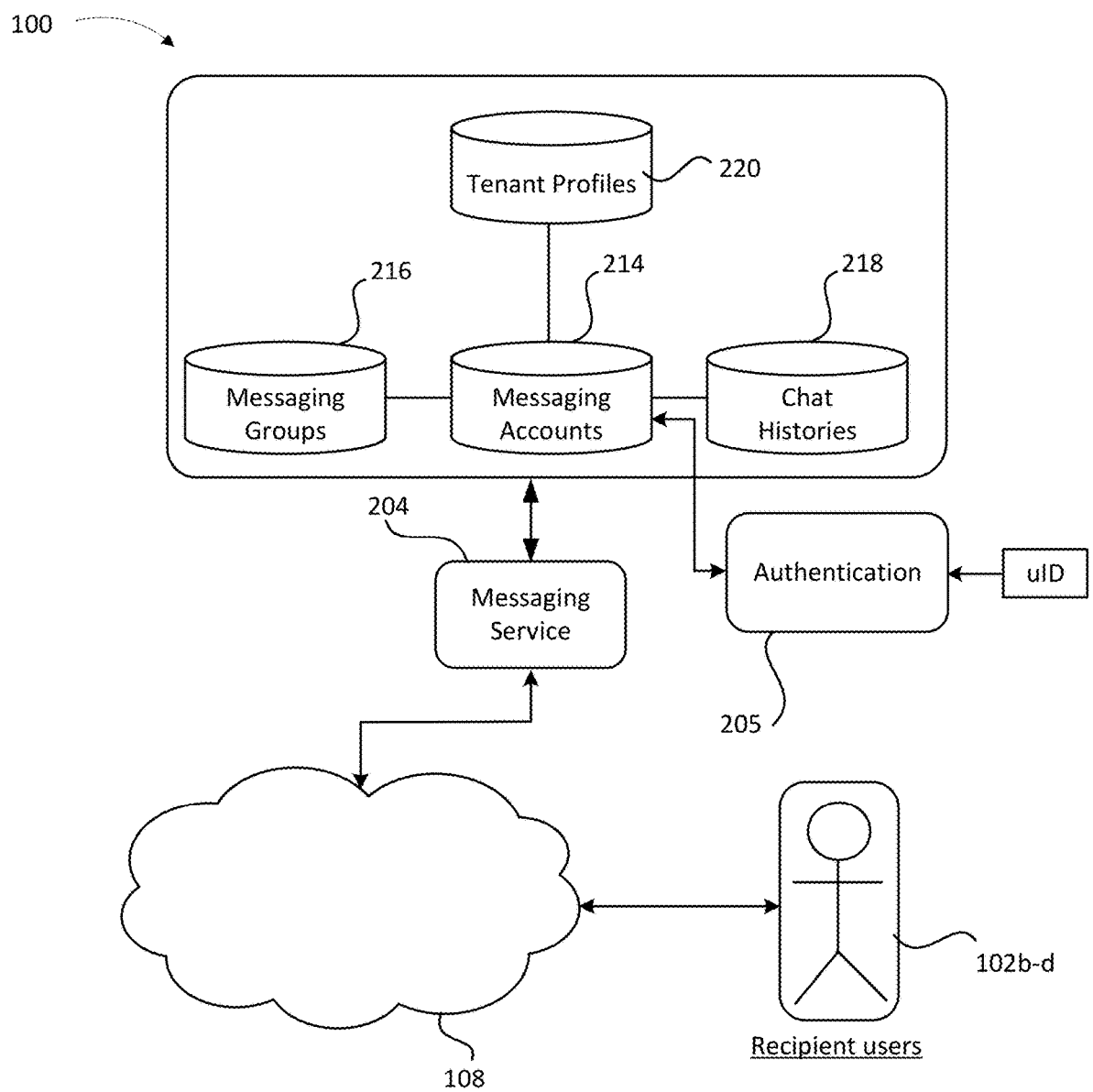
FIG. 2 shows a schematic functional block diagram for the messaging system.

With reference to FIG. 2, within the messaging system 100, user accounts 214 are created and stored in a user database (215, FIG. 3) embodied in the backend computer storage 146. User accounts within the messaging system 100 are referred to as messaging accounts. Each messaging account 214 comprises user data of its user, such as a user credential(s) and other information pertaining to the user in the context of the messaging system 100. In particular, each messaging account 214 comprises a user identifier (ID)—denoted uID in the figures—which is used to identify the user of that account within the messaging system 100. The user ID is a mobile number in the following examples. In other words, within the messaging system 100, each user has a primary identity, which is their mobile number uID in this example, and which is used to authenticate the user by the authentication function 205. By successfully authenticating himself against one of the messaging accounts 214, via the authentication function 205, a user becomes an authorised (i.e. authenticated) user of that account.

The messaging service 204 of the messaging system 100 is an instant messaging service that effects instant messaging communication sessions (chats) to allow authorized users of the messaging accounts 214 to transmit instant messages to and receive instant messages from other authorised users of the messaging system. The messaging service 204 also allows those users to create messaging groups 216. Information about each messaging groups 216, such as a group identifier (grpID) and information about the users participating in that messaging group, is stored in the backend computer storage 146. The messaging accounts 214 of users participating in a messaging group are associated with the messaging group (that is, with the group ID of that messaging group) in the backend computer storage 146. Based on this group information and the information in the associated messaging accounts 214, the messaging service 204 allows the group participants to exchange instant messages within the messaging group via the network 108. That is, to engage in a chat with any of their groups. For example, the messages may be relayed between the participants by the messaging service—for example, via one or more message relay servers or other message relay nodes of the messaging system 100—or the messaging service 204 may provide network address information to allow the participants to exchange the messages with each other directly, in a peer-to-peer fashion. A variety of instant messaging protocols are in use today supporting a range of instant messaging services from different providers. The general principals of instant messaging are well known and are therefore not described in further detail.

However the messaging service 204 is implemented, the user identifiers uID are used as a basis for the exchange of messages in each messaging group, for example by identifying user devices 104 associated with the user identifiers uID of the users in the messaging group as recipient devices for messages in the group.

The messaging service 204 stores copies of messages exchanged in each chat in the backend storage 146 (chat histories, 218), so that they can be retrieved by users participating in those chats at any time.

The messaging service 204 can also provide enhanced (rich) communication functions within chats, including the communication of actions—such as polls, surveys, meeting invites, job assignments and other interactive content items—and the exchange of rich content (audio data, image data, file sharing etc.). Each of the messaging accounts 214 is linked to one of a plurality of tenant profiles 220. A tenant can for example be an organization or a sub-division of a large organisation to which a potentially large number of users can belong (e.g. several thousand users). In essence, the messaging system 100 provides an independent chat subsystem to each of the tenants whereby any users whose messaging accounts 214 are linked to the same tenant profile 220 can create groups and engage in chats with each other etc., without any visibility of the users whose messaging accounts 214 are not linked to that tenant profile. Each of the tenant profiles 220 comprises a unique tenant ID. The user IDs of the users having messaging accounts 214 linked to that tenant profile are thus associated with that unique tenant ID.

A unique aspect of the described message system 100 is that custom action types can be defined for a particular tenant that are not visible to other tenants. This is achieved by allowing users to create custom action templates that are bound to a specific tenant profile (or potentially multiple tenant profiles). A custom action template can only be used by users having messaging accounts 214 linked to a tenant profile 220 to which that custom action template is bound.

Figure 3:
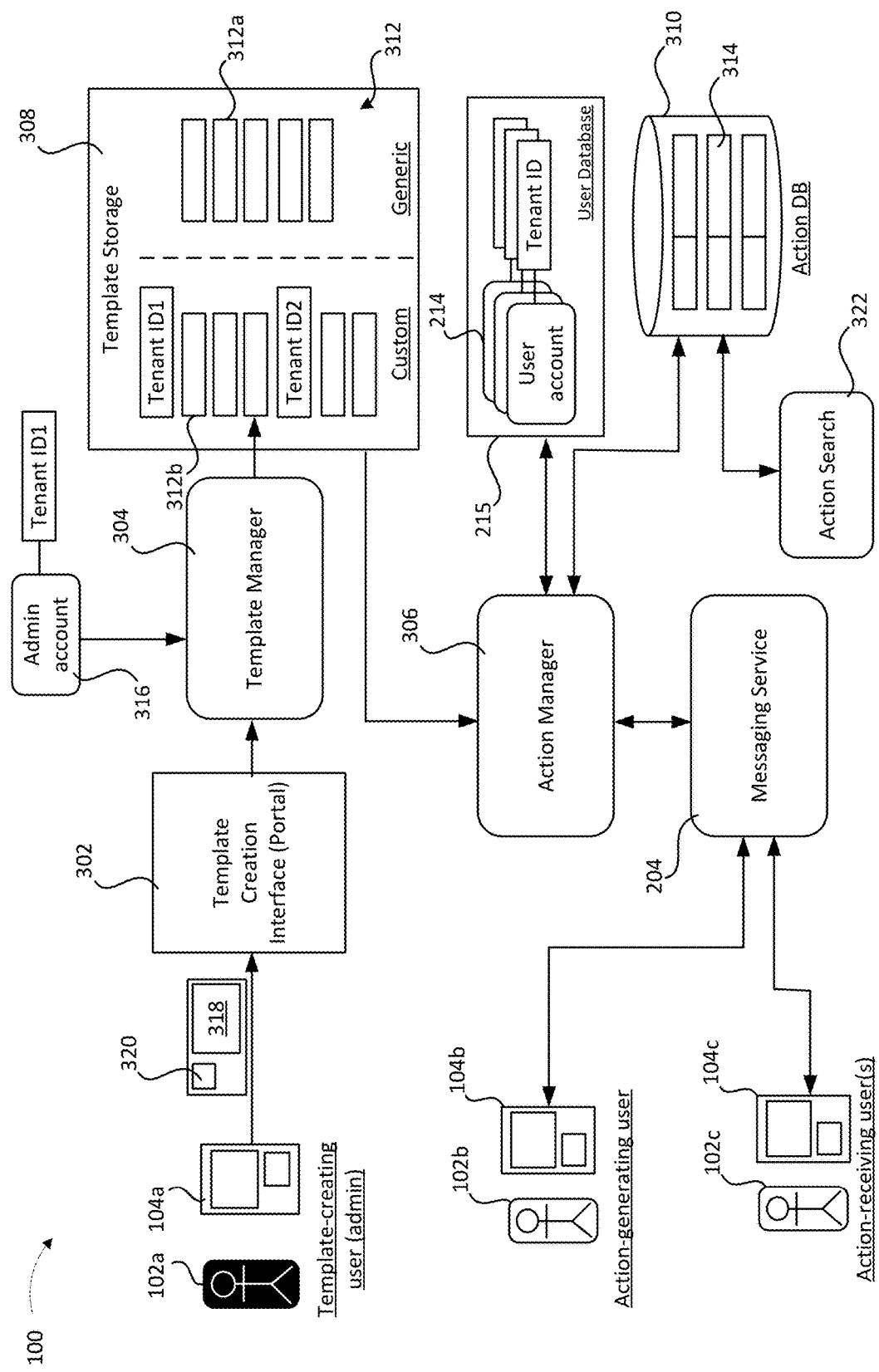
FIG. 3 shows another schematic functional block diagram for the messaging system.

FIG. 3 shows a functional block diagram for the messaging system 100, which represents functionality of the messaging system 100 relating to actions. The messaging system 100 is shown to comprise a template creation interface 302, in the form of a portal; a template manager 304 and an action manager 306. The template manager 304 and action manager 306 both have access to template storage 308 which is embodied in the back-end storage 146. The action manager 306 has access to an action database (DB) 310, which the action manager 306 is responsible for maintaining and which is also embodied in the back-end storage 146. The template storage 308 holds action templates 312 and the action manager 306 creates actions 314 in the action database 310 according to action templates 312 stored in the template storage 308. The action templates 312 comprise both generic action templates 312a, which are available for use by all of the users of the messaging system 100, and custom action templates 312b created by the template manager 304. Each of the custom action templates 312b is associated in the template storage 308 with at least one tenant ID and is only available for use by users on the corresponding tenant. That is, only those users whose user IDs in the user database 215 are linked to that tenant ID. The action manager 306 has access to the user database 215 and can thus determine whether any of the custom action templates 312b is available to any given user, by determining whether that user's user account 214 is linked to a tenant ID that matches a tenant ID to which that custom action template 312b is bound.

The template manager 304 allows certain users to create custom action templates 312b via the portal 302 on behalf of specific tenants. In particular, the template manager 304 allows an administrator (admin) for a given tenant to create custom action templates 312b for that tenant. In this example, the user 102a is an admin for a tenant having tenant ID1. That is, having an admin account 316 linked to tenant ID1. The admin account 316 can be one of the messaging accounts 214 that is configured as an admin account, or it can be a separate account that is stored and managed separately. Once the template-creating user 102a has authenticated himself at his user device 104a based on his admin account 316, he is able to upload template creation data 318 via the portal 302, which is rendered accessible to the template manager 304. The template creation data 318 is in the form of data package, examples of which are described later. The template creation data 318 is provided in association with data 320 that identifies the template-creating user 102a in relation to his admin account 316. The data 320 can for example comprise a user identifier of the template-creating user that can be matched to a user identifier of the admin account 316, and/or the data 320 can comprise an authentication token (or similar) that is associated with the admin account 316. Whatever form it takes, the data 320 provided in association with the template creation data 318 allows the admin account 316, and thus the tenant ID to which it is linked, to be identified, which in turn allows the template manager 304 to create a custom-action template 312b in the template storage 308 bound to that tenant ID. The template manager 304 binds the custom action template 312b to the tenant ID by associating the custom action template 312b with the tenant ID in the template storage 308.

Once this custom action template 312b has been created and associated with tenant ID1, the action manager 306 will allow any user whose user account 214 is linked to tenant ID1 to generate actions 314 in the action database 310 according to that custom action template (and only such users). That is, the custom action template 312b is rendered available to (only) the users having the subset of user accounts 214 linked to tenant ID1, i.e. the tenant ID linked to the admin account 316 of the user 102a who created the custom action template 312b. Ultimately, this subset of user accounts is identified by the data 320 provided in association with the template creation data 318, via the admin account 316 and the tenant ID to which it is linked.

Alternatively, the admin 102a may nominate specific user(s) or group(s) in the associated data 320. For example, the data 320 may comprise one or more user IDs or group IDs. In that case, the custom action template 312b is only made available to the nominated users or groups.

In this manner, different custom action templates can be associated with different subsets of the user IDs, and therefore rendered available to different subset of the users of the messaging system. A custom action template available to one user will not be available to another user whose user ID is not associated with the custom action template.

Additionally, the action manager 306 will allow any user of the messaging system to create an action 314 in the action database 310 according to any one of the generic action templates 312a. Thus, for at least some users of the messaging system, a mixture of generic and custom action templates are available.

Actions are generated and circulated between users within chats effected by the messaging service 214. An action-generating user (102b in this example) uses his user device 104b to instruct the generation of an action via the messaging service 204. In response, the messaging service 204 co-operates with the action manager 306 to cause the action manager 306 to create an action 314 in the action database 310 according to the user's instruction. Once generated, the action manager 306 and messaging service 204 co-operate to render data of the generated action 314 available to at least one action-receiving user (102c in this example) at his user device 104c within the chat, by pushing or otherwise transmitting a message to the user device 104c of the action-receiving user 102c. For example, the action-generating user 102b can generate the action within a chat between a particular messaging group, in which case data of the generated action is rendered available to all of the other users participating in the group chat.

Each action-receiving user 102c can then respond to the action within the chat by providing information to the messaging service 204 in response to the action. The messaging service 204 co-operates with the action manager 306 to the original action 314 in the action database 310 according to the action-receiving user's response. That is, based upon the information provided by the action-receiving user 102c in response to the action. The updates to the action 314 are rendered available to the action-generating user 102b within the chat itself or via a separate search interface, by pushing or otherwise transmitting a message to the user device 104b of the action-generating user 102b. This is described in further detail later.

A search component 322 of the messaging system 100 is also shown in FIG. 3, via which the users 102b, 102c can search for actions 314 in the action database 310 which they have sent or received, by providing suitable search inputs to the search component 322 via their respective user devices 104b, 104c.

The template manager 304, action manager 306 and search component 322 are functional components of the messaging system 100, whose functionality is implemented by respective parts of the messaging code when executed on the at least one processor 144 of the backend 142.

Figure 4A:
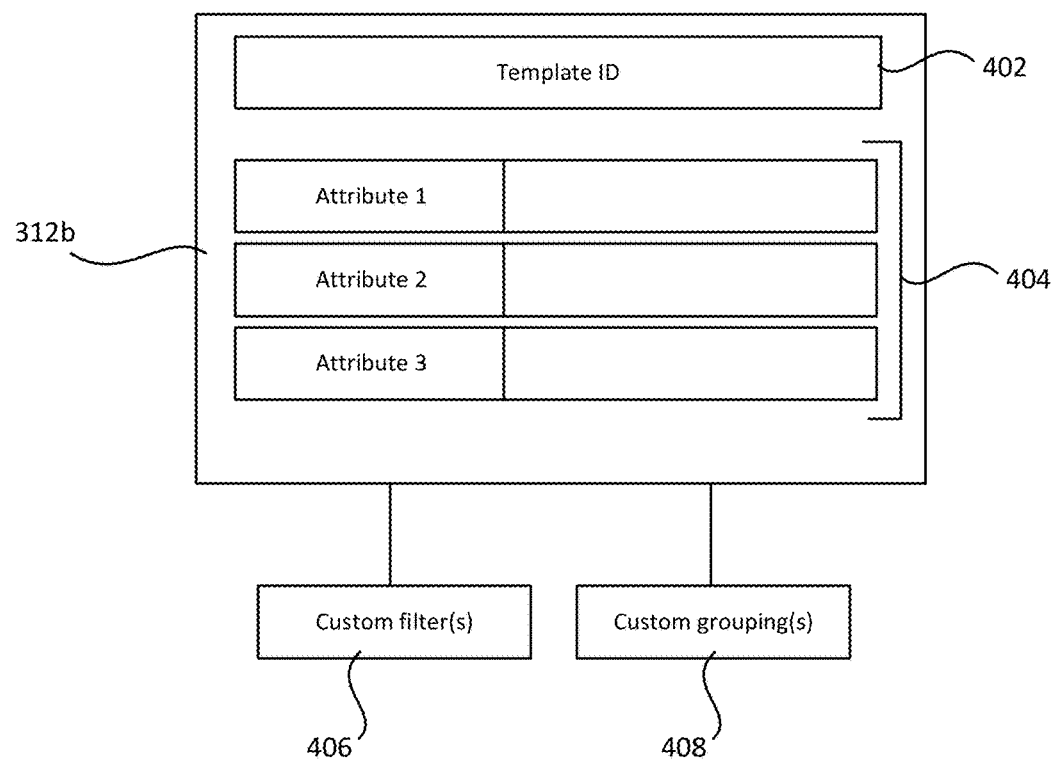
FIG. 4A shows a schematic example of an action template for generating an action.

FIG. 4A illustrates certain structure of a custom action template 312b according to one example. The custom action template 312b has a unique template ID 402, which can be a name chosen by the template creating user 102a. The custom action template 312b also has a set of custom attributes 404 defined by the template-creating user 102a in the template creation package 318. The template 312b also includes information about each of the custom attributes 404 such as an attribute name, and attribute type and any other information relating to the attribute 404 that may be relevant. The custom action package 318 provided by the user 102a can also specify one or more custom filters 406 to be applied to the custom attributes 404 and/or one or more custom grouping rules 408 to be applied to the custom attributes 404. These are stored at the back-end 142 in association with the custom action template 312b.

In addition, one or more of the custom attributes 404 may be marked in the custom action package 318 as indexable. When an action is created according to the template 312b in the action database 310, those attributes are indexed to allow faster searching of those attributes.

Generic action templates 312a have a similar structure, which allows custom and generic action templates 312b, 312a to be used to generate actions in the same manner.

Figure 4B:
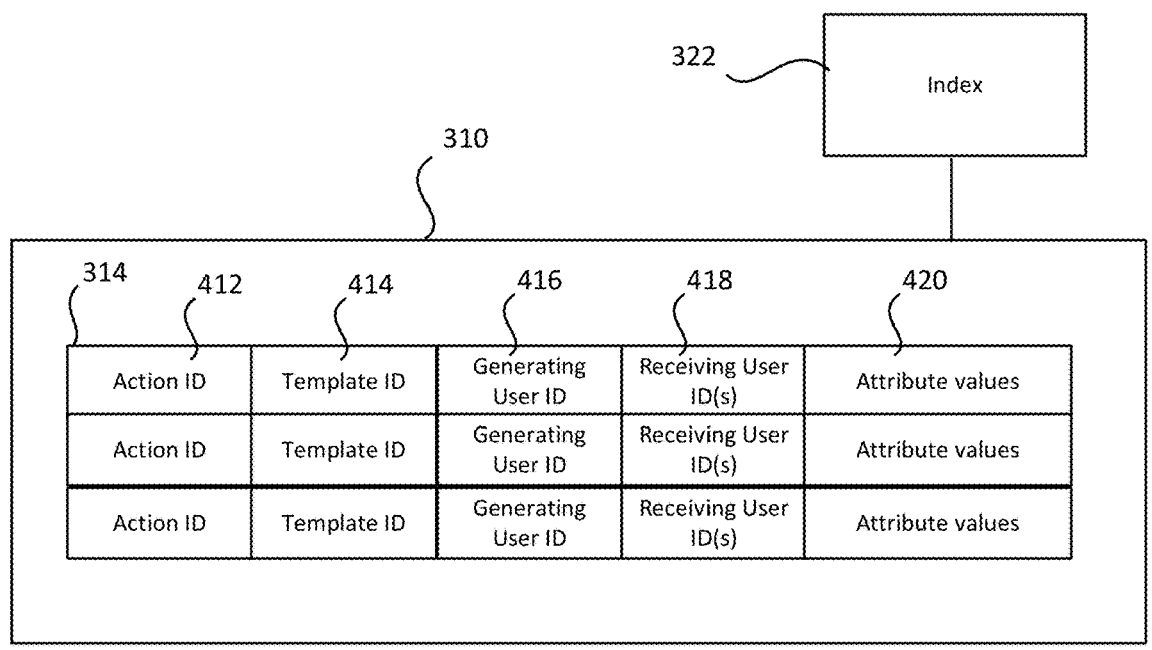
FIG. 4B shows a schematic example of an action generated in an action database according to an action template.

FIG. 4B shows further details of how actions are stored in the action database 310 according to one example. Each action 314 in the action database 310 has an action ID 412 and a template ID 414. The action ID 412 is unique to that action, whereas the template ID 414 identifies the action template 312 (custom or generic) according to which the action 314 was generated. Different actions may be generated according to the same template and therefore having matching template IDs. The action 314 also has a user ID 416 of the user who generated the action (user 102b in the example of FIG. 3) and an identifier 418 of at least one user who received the action 314 (user 102c in the Example of FIG. 3). Alternatively or in addition, the action 314 may have a group ID for a messaging group for which it was generated. The action 314 also has values 420 of each of the set of custom attributes 404 of the template it was generated from. These may be default values when the action is first created or they may be values that are initially specified by the action-generating user 102b. The values can be modified as the action-receiving user or users 102c respond to the action.

Any of the custom attributes 404 marked as indexable are indexed in an index 322 for the action database 310 to allow faster searching to be performed on those attributes. Database indexing per se is well known and is therefore not discussed in detail herein. The unique aspect to the described indexing is that the template-creating user 102a can specify which attributes should be indexed when creating the template 312b.

In this manner, a great deal of flexibility is provided when it comes to creating custom action templates. As an example, a template could be created for a "vacation request" action with custom attributes 404 for specifying a set of requested vacation days and for indicating whether or not the request has been accepted. An action-generating user wishing to submit a vacation request to, say, his supervisor creates an action according to the vacation request template. He specifies his requested vacation days, which are recorded one or more attribute values, and the status attribute is given a default value of pending initially. The supervisor receives the generated action in a chat and can respond to it by either rejecting or accepting the request within the chat. Once rejected or accepted, the value of the status attribute is updated to reflect the new status accordingly.

FIG. 5A shows an example of a user interface rendered, by the messaging app, on the display 108 of the user device 104, which a mobile device in this example. The user interface (UI) shows a chat between members of a particular messaging group. Instant messages transmitted and received between the members of that group are shown on the UI as a sequence of messages ordered according to time. The user's own messages are displayed towards one side of the display 108 whereas messages from other users are displayed towards the opposite side of the display 108. In this manner, the UI provides a messaging interface for the group in question.

FIG. 5B shows a plurality of user interface elements 502 (action-generating elements) which can be selected by the user 102b of the user device 104b to generate actions within the chat. The action generating elements 502 are displayed in association with the sequence of messages displayed on the messaging interface. Each of the action generation elements represents either a generic action template available to all users or a custom action template available to the user 102b of the user device 104b. That is, action-generating elements 502 may be displayed for a mixture of custom and generic action templates simultaneously on the same user interface. The user 102b can select any one of the action generating elements 502 in order to generate an action, within the chat, according to the action template that element represents. Data of the generated action is rendered accessible to all of the other users in the messaging group via the chat.

Figure 6B:
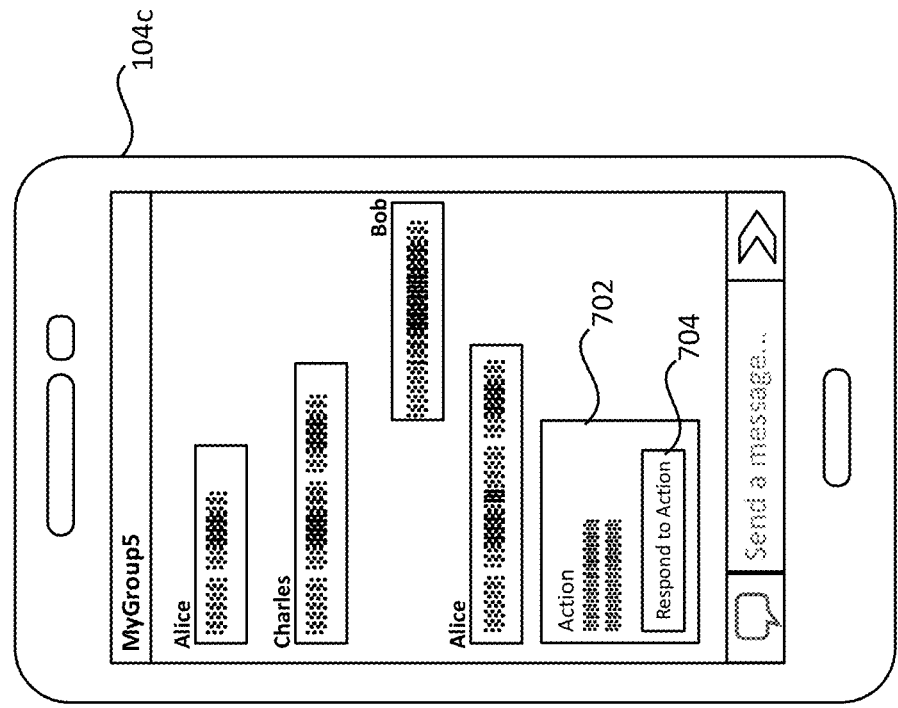
FIG. 6B shows a schematic illustration of a messaging interface after an action has been notified.
Figure 6A:
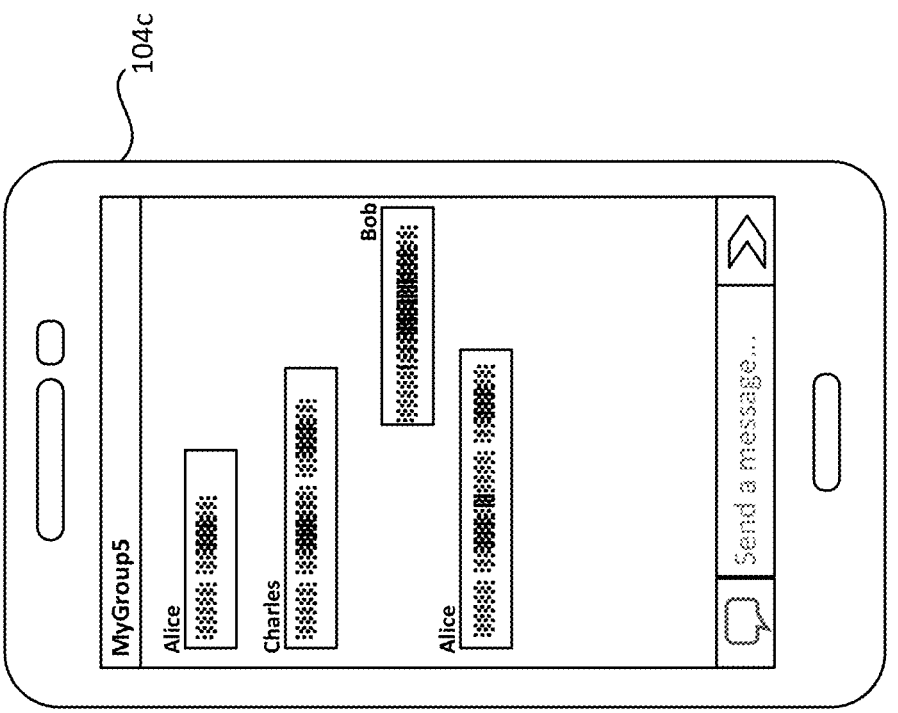
FIG. 6A shows a schematic illustration of a messaging interface displayed on a mobile device of an action-receiving user.

By way of example, FIG. 6A shows a corresponding messaging interface displayed at the user device 104c of the action receiving user 102c before an action has been generated. FIG. 6B shows that messaging interface after an action has been generated by the action-generating user 102b selecting one of the action generating elements 502 of FIG. 5B. A notification 702 of the action is displayed within the time-ordered sequence of displayed messages and the notification 702 comprises a selectable option 704 to respond to the action. In this manner, data of the action is rendered accessible to the action-receiving user 102c within the chat in which the action was generated.

FIG. 7A shows an example of a search interface displayed at a user device via which a user can search both actions he has sent and actions he has received. Such actions can be located in the action database 310 based on the identifiers 416, 418 of the generating and receiving users respectively. In this example, the user has searched for actions of a particular type, by entering a desired action name 910—"Job" in this example. The user can also enter additional or alternative search criteria to search for specific types of actions he has sent or received although this is not shown explicitly in FIG. 7A.

FIG. 7B shows how the user can filter and group the search results according to the custom filters 406 and grouping rules 408 respectively defined for the type of action 910 in question. That is, in this example, the custom filters and grouping rules associated with the template for the Job action, as defined (in the case of a custom job action template) by the template-creating user who created the Job template. In the example of FIG. 7B, at least two custom filters are defined which the user can select from via filtering elements 914 of the UI, and at least one custom grouping rule is defined which the user can choose whether or not to apply via a grouping element 916 of the UI. When any one of the filters 914 is selected the search results are filtered according to the selected filter. Likewise when any of the custom grouping rules 916 is selected the search results are grouped according to the selected rule.

Figure 8A:
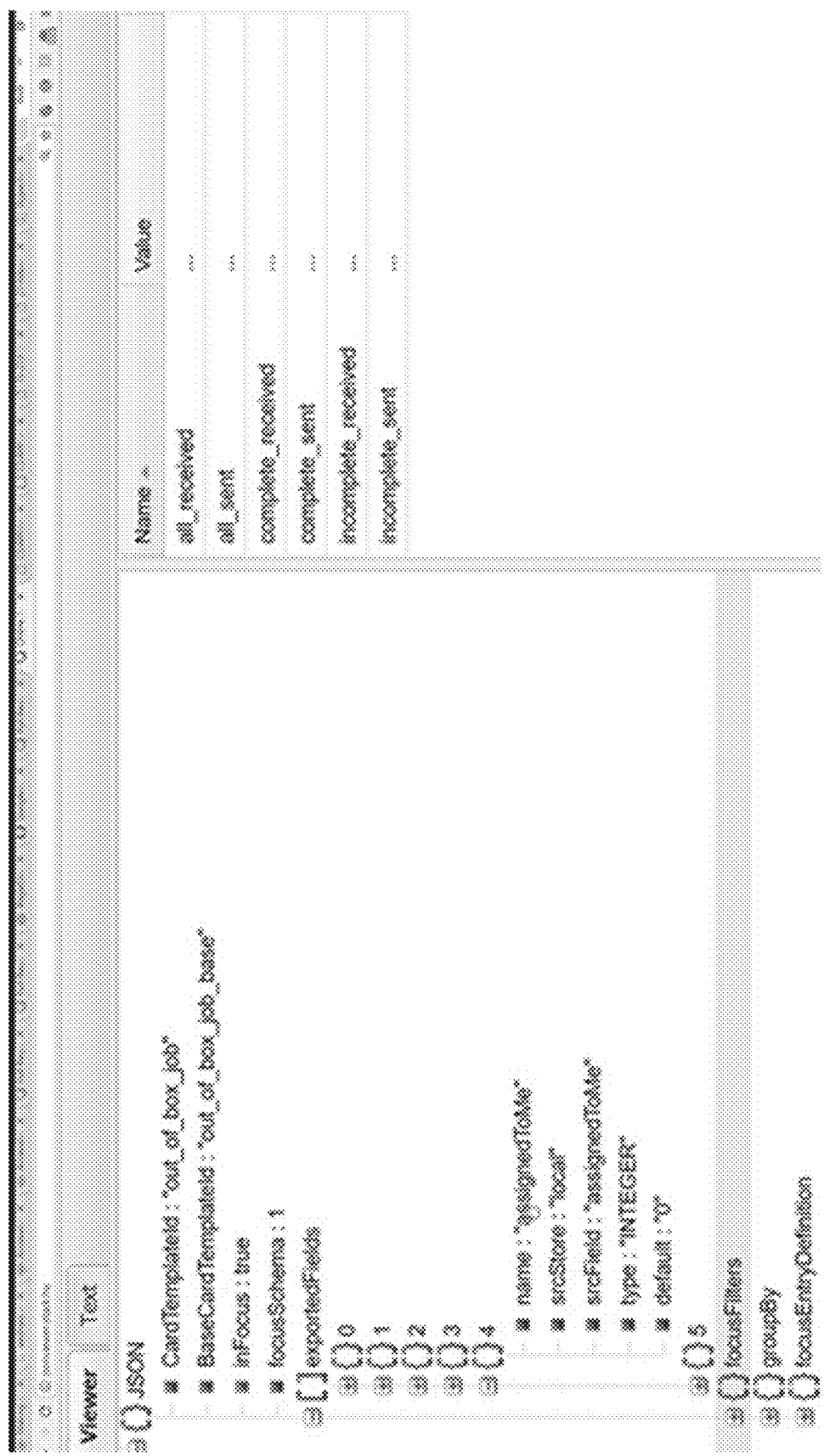
Figure 8B:
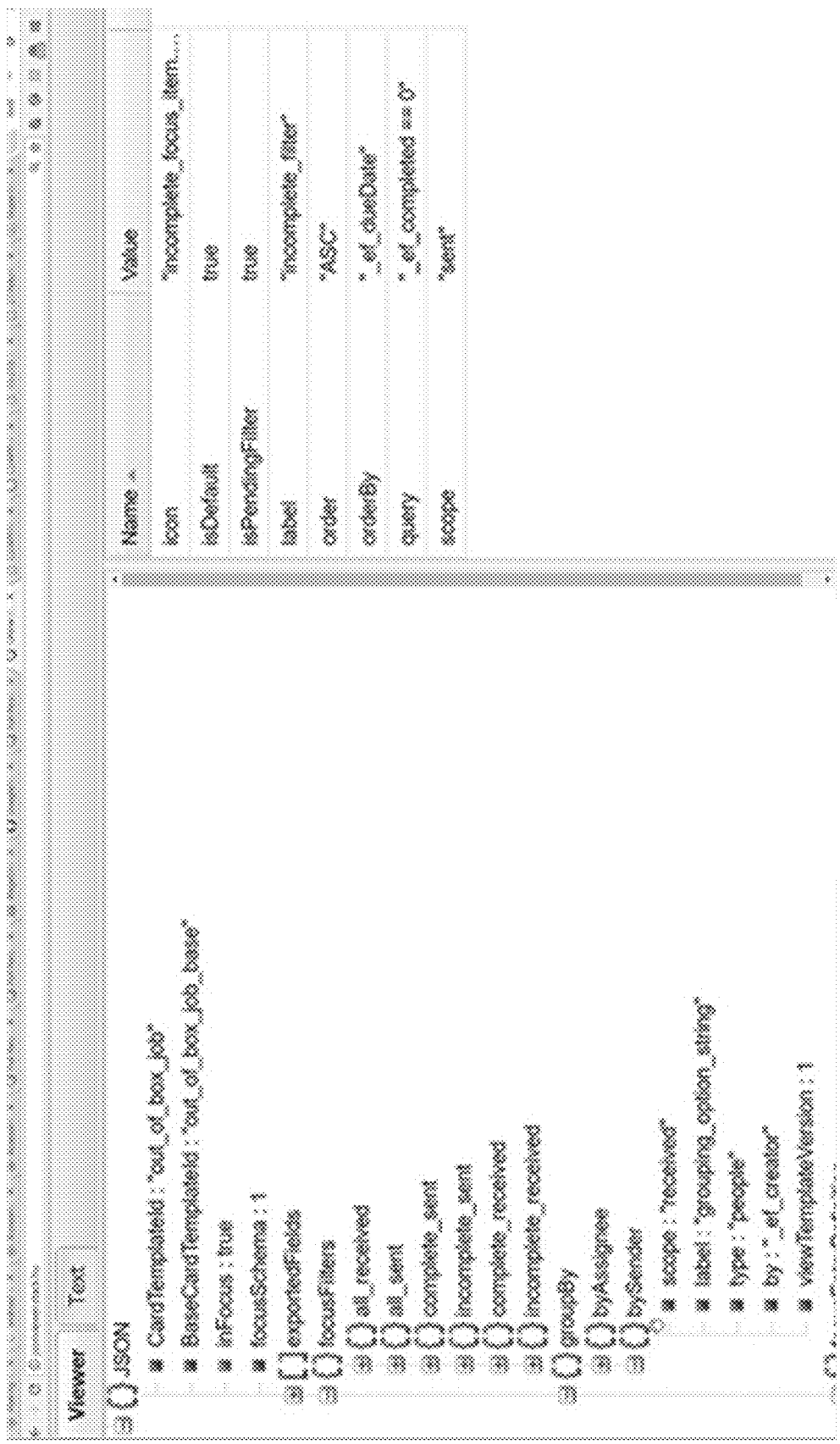
Figure 8C:
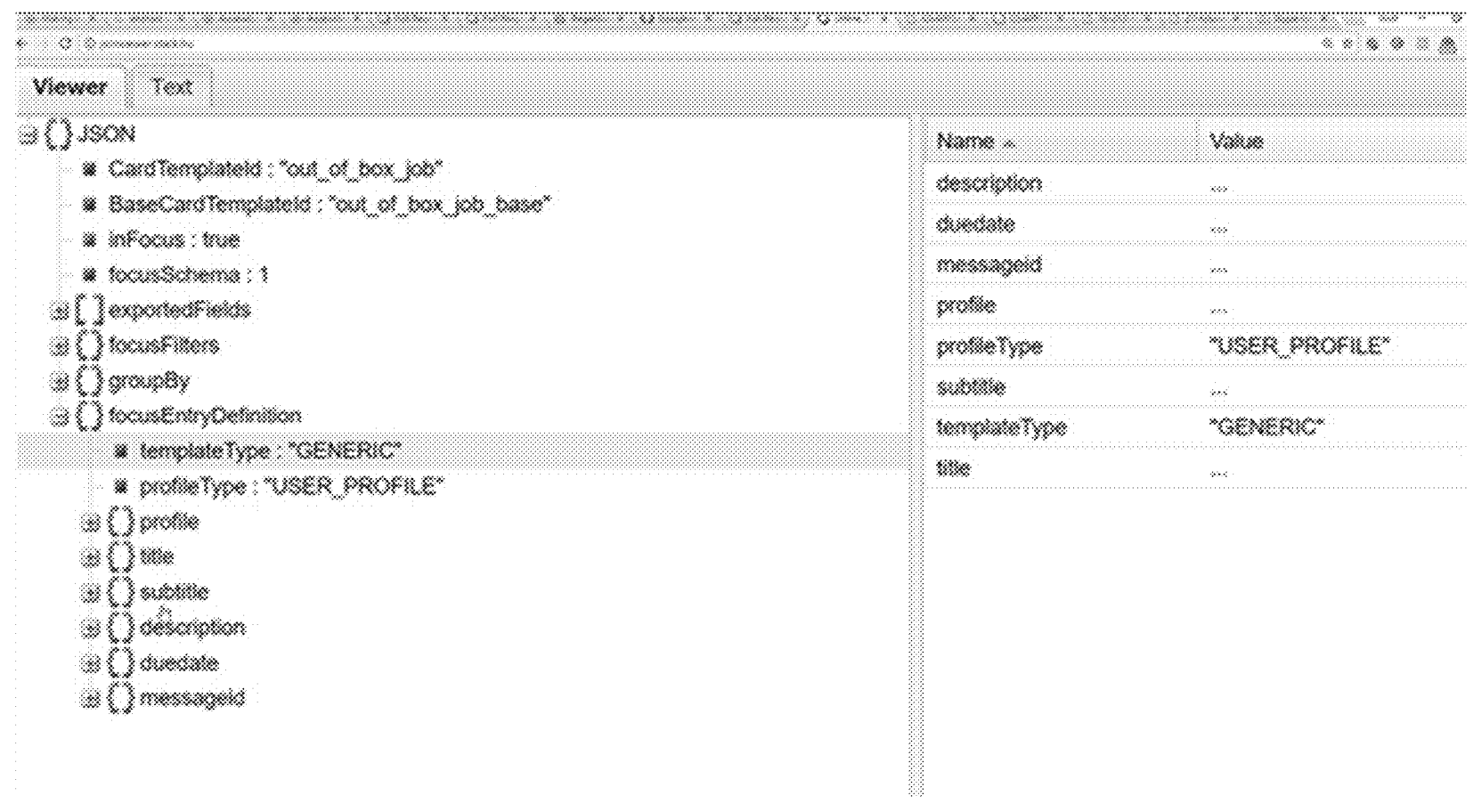

The custom action package 318 can be built according to a predetermined schema, such as a JavaScript Object Notation (JSON) or Extensible Markup Language (XML) schema, according to a declarative model. By way of examples, FIGS. 8A to 8C show an example of a custom action package created according to a JSON schema where the custom attributes 404 filtering rules 406 and grouping rules 408 are defined using a JSON syntax. In this example, the attributes 404 defined under "exported fields" are the attributes marked as indexable in the custom action package 318. The JSON syntax is interpreted by the template manager 304 to create a custom action template for use by the action manager 306.

To further aid illustration, some example use-case scenarios will now be described.

Suppose an organization has created a new custom action template for a custom action type called "Leave Request". Anyone in that organization can create cards of that type. As and when this card is sent from one user to another user (e.g. his manager) in a hierarchy, it will be visible to both users—the user who has sent this and the manager who has received this card to approve. For the sender it will be shown in a "sent pane" of the UI, while for the receiver it is shown in the "received pane" of the UI.

While creating this action type through the portal 302 (which is used by third parties to create action types), the creator will specify what status this card can take—(e.g. vacation requested, vacation denied, vacation approved etc.) in the action template itself. Since this is another type of action it will start showing in the search landing page. The user can search for existing actions via the search landing page and the system will select from the respective status and start showing them as filters for the users to choose from. Custom filters can be defined in the template creation package 318 used to create the new action type. Given all the information regarding a particular action (e.g. leave request) is available in the definition of this card, the search component 322 utilizes these definitions to show search results in the most relevant form. The search component 322 implements a generic search mechanism such that it is able to handle all new types of cards, created by anyone.

The only cards that will surface in the search are ones that have been instantiated on a client mapped to a specific tenant. Which means a card being used in Tenant A will never be shown in search results of Tenant B. Hence this search is specific to the action type being used in the user's own tenant.

Custom actions are pushed from a server of the messaging system 100 to certain group conversations. The custom action definition is packaged (as archive) in a form of a manifest. The manifest has definitions for attributes for a given entity and their behaviour. These entity attributes are indexed and are managed by the system 100 and hence it is able to surface this action based on specific query. These attributes can also take calculated value as well, which will be evaluated by processing expressions defined a custom declarative language.

As orgs deploy their respective custom actions, they can be incorporated without any change to the code (software) of the messaging system to include them in user's search results.

Note references to software executed on at least one processor (or similar) can mean all of the software are executed on the same processor, or that portions of the code can be executed on different processors, which may or may not be co-located. For example, in the example architecture of FIGS. 1 to 2, the messaging service 204, authentication function 205, template manager 304, action manager 306, search component 322, and any other components, modules or logic disclosed herein can be individually implemented on one or multiple processors. In practice, different code portions may be implemented on different processors at different locations, possibly in different servers, possibly in data centres which can communicate via the network 108 or a dedicated back-end connection, for example. Note also that "computer storage", "electronic storage" and any other form of "storage" refer generally to one or more computer-readable storage devices, such as magnetic or solid-state storage devices. For multiple devices, there may or may not be spatially collocated. For example, different parts of the backend storage 146 may be implemented at different data centres, for example. The system code can be stored for execution at the system in question in one or more computer readable memory devices. The features of the techniques described herein are platform-independent, meaning that the techniques may be implemented on a variety of commercial computing platforms having a variety of processors. For example, the systems may include a computer-readable medium that may be configured to maintain instructions that cause the systems, and more particularly any operating system executed thereon and associated hardware of the system to perform operations. Thus, the instructions function to configure the operating system and associated hardware to perform the operations and in this way result in transformation of the operating system and associated hardware to perform functions. The instructions may be provided by the computer-readable medium to the system processor(s) through a variety of different configurations. One such configuration of a computer-readable medium is signal-bearing medium and thus is configured to transmit the instructions (e.g. as a carrier wave) to the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions and other data. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A messaging system comprising:
at least one processor configured to
receive, from a template-creating user, template creation data for creating a custom action template and associated data identifying a subset of user identifiers associated with the messaging system;
create and store the custom action template according to the template creation data, and associate the custom action template with the subset of the user identifiers so as to render the custom action template available to only users having an user identifier included in the subset of the user identifiers;
display, to an action-generating user distinct from the template-creating user, a user interface including a plurality of selectable action generating elements for an instant messaging communication session, wherein each of the plurality of selectable action generating elements is associated with an action template and wherein the plurality of selectable action generating elements includes a selectable action generating element associated with the custom action template based on whether an identifier of the action-generating user is included in the subset of the user identifiers; and
in response to receiving an instruction from the action-generating user selecting the selectable action generating element associated with the custom action template, generate an action according to the custom action template and make the action accessible to an action-receiving user in the instant messaging communication session.

2. A messaging system according to claim 1, wherein the at least one processor is configured to store generic action templates available to all of the users of the messaging system.

3. A messaging system according to claim 1, wherein instant messages transmitted and received between the action-generating user and the action-receiving user are displayed as a sequence of messages at a user device of the action-receiving user, and a messaging component is configured to transmit a message to cause a notification of the action to be displayed at the user device in the displayed sequence of messages.

4. A messaging system according to claim 1, wherein an action manager is configured to modify the action in an action database in response to an instruction from the action-receiving user, and to transmit a message to a user device of the action-generating user to render data of the modified action accessible to the action-generating user in the instant messaging communication session.

5. A messaging system according to claim 1, wherein the messaging system is configured to cause a user device of the action-generating user to display a set of user interface elements, each representing one action template available to the action-generating user, and the at least one processor is configured to generate, in response to the action-generating user selecting one of the user interface elements, the action according to the action template represented by the selected user interface element.

6. A messaging system according to claim 5, wherein the at least one processor is configured to store generic action templates available to all of the users of the messaging system, wherein at least one of the user interface elements represents a generic action template and at least another of the user interface elements represents the custom action template available to the action-generating user.

7. A messaging system according to claim 1, wherein the action is associated in an action database with the user identifier of the action-generating user and/or the user identifier of the action-receiving user.

8. A messaging system according to claim 1, wherein the custom action template has at least one custom attribute derived from the template creation data, wherein any action generated according to the custom action template comprises a value of the at least one custom attribute.

9. A messaging system according to claim 1, wherein the messaging system comprises a search component configured to receive a search input, and generate search results by searching an action database according to the search input for actions generated and/or received by a user.

10. A messaging system according to claim 9, wherein the action is associated in the action database with the user identifier of the action-generating user and/or the user identifier of the action-receiving user, wherein the search input is received from the action-generating user or the action-receiving user and the search component is configured to generate the search results by searching for actions generated by that user and/or actions received by that user.

11. A messaging system according to claim 9, wherein the custom action template has at least one custom attribute derived from the template creation data, wherein any action generated according to the custom action template comprises a value of the at least one custom attribute, wherein the search component is configured to search the action database based on the at least one custom attribute.

12. A messaging system according to claim 9, wherein the custom action template has at least one custom attribute derived from the template creation data, wherein any action generated according to the custom action template comprises a value of the at least one custom attribute, wherein the custom action template is associated in template storage with at least one custom filter derived from the template creation data for the at least one custom attribute, wherein the search component is configured to filter the search results according to the at least one custom filter.

13. A messaging system according to claim 9, wherein the custom action template has at least one custom attribute derived from the template creation data, wherein any action generated according to the custom action template comprises a value of the at least one custom attribute, wherein the custom action template is associated in template storage with at least one custom grouping rule derived from the template creation data for the at least one custom attribute, wherein the search component is configured to group the search results according to the at least one custom grouping rule.

14. A messaging system according to claim 9, wherein the custom action template has at least one custom attribute derived from the template creation data, wherein any action generated according to the custom action template comprises a value of the at least one custom attribute, wherein the at least one custom attribute is marked as indexable in the template creation data and a template manager is configured to index the at least one custom attribute in response to determining that the at least one custom attribute is marked as indexable in the template creation data.

15. A messaging system according to claim 1, wherein the subset of the user identifiers are bound to a common identifier in a user database, wherein the data identifying the subset of the user identifiers comprises or indicates the common identifier and thereby identifies the subset of the user identifiers.

16. A messaging system according to claim 15, wherein the data identifying the subset of the user identifiers comprises or indicates an identifier of the template-creating user, which is associated with the common identifier in the user database.

17. A method of creating action templates in a messaging system, the messaging system for effecting instant messaging communication sessions between users of the messaging system and having a user database holding user identifiers of the users, the method comprising, at the messaging system:
receiving, from a template-creating user, template creation data for creating a custom action template and associated data identifying a subset of the user identifiers held in the user database of the messaging system;
creating in template storage the custom action template according to the template creation data, the custom action template for generating an action in an action database of the messaging system;
associating the custom action template with the subset of the user identifiers so as to render the custom action template available to only the users having an user identifier included in the subset of the user identifiers;
displaying, to an action-generating user distinct from the template-creating user, a user interface including a plurality of selectable action generating elements for an instant messaging communication session, wherein each of the plurality of selectable action generating elements is associated with an action template and wherein the plurality of selectable action generating elements includes a selectable action generating element associated with the custom action template based on whether an identifier of the action-generating user is included in the subset of the user identifiers.

18. A method according to claim 17, comprising:
in response to an instruction from one of a subset of users, generating the action in the action database according to the custom action template; and
transmitting a message to a user device of at least one action-receiving user to render data of the generated action accessible to the at least one action-receiving user in an instant messaging communication session effected by the messaging system.

19. A method according to claim 18, wherein the at least one action-receiving user is one of the subset of users.

20. A computer program product for use in a messaging system, the messaging system having a user database configured to hold user identifiers of users, the computer program product comprising code stored on a computer-readable storage medium and configured, when executed in the messaging system, to implement operations of:
receiving a user identifier of an action-generating user;
accessing template storage holding a custom action template, wherein the custom action template is associated with a subset of the user identifiers such that the custom action template is available to only the users having an user identifier included in the subset of the user identifiers;
determining that the received user identifier matches one of the subset of the user identifiers associated with the custom action template and, in response, causing a user interface element representing the custom action template to be displayed at a user device of the action-generating user;
displaying, to the action-generating user distinct from a template-creating user, a user interface including a plurality of selectable action generating elements for an instant messaging communication session, wherein each of the plurality of selectable action generating elements is associated with an action template and wherein the plurality of selectable action generating elements includes a selectable action generating element associated with the custom action template based on whether an identifier of the action-generating user is included in the subset of the user identifiers;
in response to an instruction from the action-generating user selecting the selectable action generating element associated with the custom action template, generating an action in an action database according to the custom action template; and
transmitting a message to a user device of at least one action-receiving user to render data of the generated action accessible to the at least one action-receiving user in an instant messaging communication session effected by the messaging system.

* * * * *